United States Patent [19]

Funk

[11] Patent Number: 4,511,958
[45] Date of Patent: Apr. 16, 1985

[54] COMMON BUS ACCESS SYSTEM USING PLURAL CONFIGURATION TABLES FOR FAILURE TOLERANT TOKEN PASSING AMONG PROCESSORS

[75] Inventor: Gerhard Funk, Ennetbaden, Switzerland

[73] Assignee: Patelhold Patentverwertungs- & Elektro-Holding AG, Glarus, Switzerland

[21] Appl. No.: 314,733

[22] Filed: Oct. 26, 1981

Related U.S. Application Data

[63] Continuation-in-part of Ser. No. 194,000, Oct. 6, 1980, abandoned, which is a continuation of Ser. No. 6,907, Jan. 26, 1979, abandoned.

[30] Foreign Application Priority Data

Jan. 30, 1978 [CH] Switzerland ............................ 984/78

[51] Int. Cl.³ .......................... G06F 3/04; G06F 15/16
[52] U.S. Cl. ............................ 364/200; 364/300; 370/60; 370/85; 370/92; 371/11; 371/33
[58] Field of Search ... 364/200 MS File, 900 MS File, 364/300; 370/92, 85, 86, 60, 93, 94; 371/11, 12, 14, 32-34

[56] References Cited

U.S. PATENT DOCUMENTS

| 4,210,780 | 7/1980 | Hopkins et al. | 370/80 |
|---|---|---|---|
| 4,281,380 | 7/1981 | De Mesa et al. | 364/200 |
| 4,347,563 | 8/1982 | Paredes | 364/137 |
| 4,402,082 | 8/1983 | Cope | 371/22 |
| 4,410,983 | 10/1983 | Cope | 371/8 |
| 4,451,827 | 5/1984 | Kahn | 340/825.52 |

OTHER PUBLICATIONS

R. M. Metcalfe and D. R. Boggs, "Ethernet: Distributed Packet Switching for Local Computer Networks", Comm. ACM 19:7, Jul. 1976, pp. 395-404.

Primary Examiner—James D. Thomas
Assistant Examiner—A. E. Williams, Jr.
Attorney, Agent, or Firm—Orville N. Greene

[57] ABSTRACT

A data exchange system includes a plurality of data processing partners which communicate with each other via a common bus. Access to communication is sequentially transferred from one partner to another by the generation of an access-passing-on message which is transmitted via the common data bus. The access-passing-on message includes a source address identifying the address of the baton passing or token passing partner and a destination address identifying the address of that partner which is next to receive access to communication. If, after receiving access to communication, a partner has data available for transmission, it transmits a data information message including an address block identifying the type of information being transmitted and at least one data information block containing the data being transmitted. Each partner which receives the so transmitted data information message error-free transmits an acknowledgment message which identifies its own address and indicates that it has received an error-free transmission of the data information message.

23 Claims, 14 Drawing Figures

| ST | A | B | E |
|----|---|---|---|

FIG. 1

| ST | A | B | S | TYP | DT | PR | E |
|----|---|---|---|-----|----|----|---|

FIG. 2

| ST | A | B | Q |
|----|---|---|---|

FIG. 3

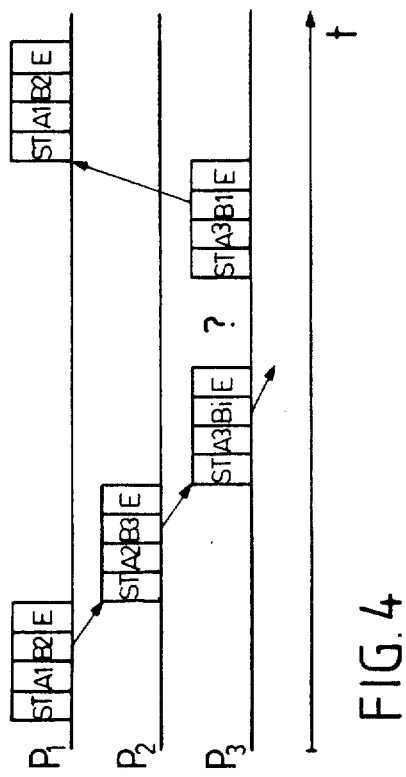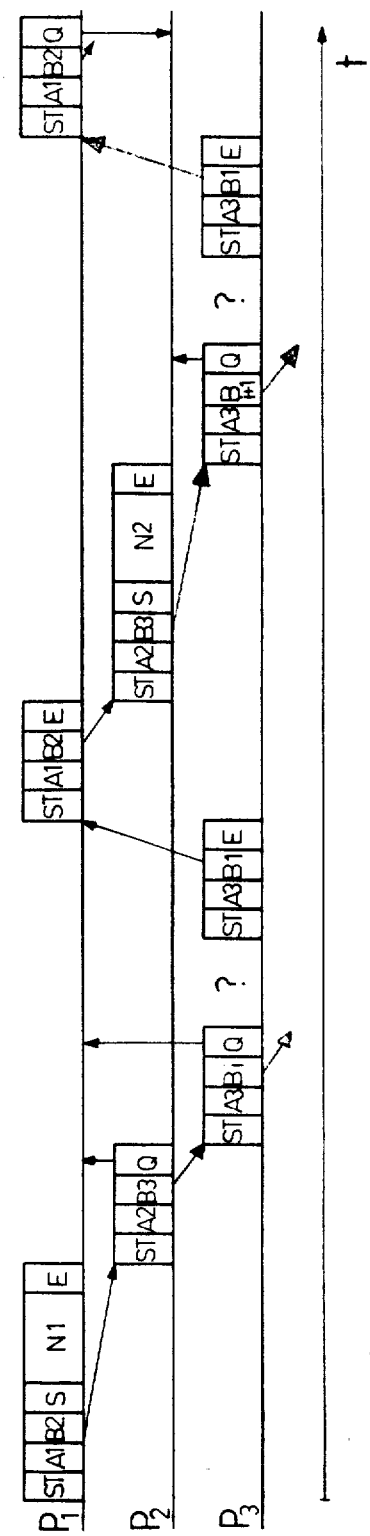
FIG. 4
FIG. 5

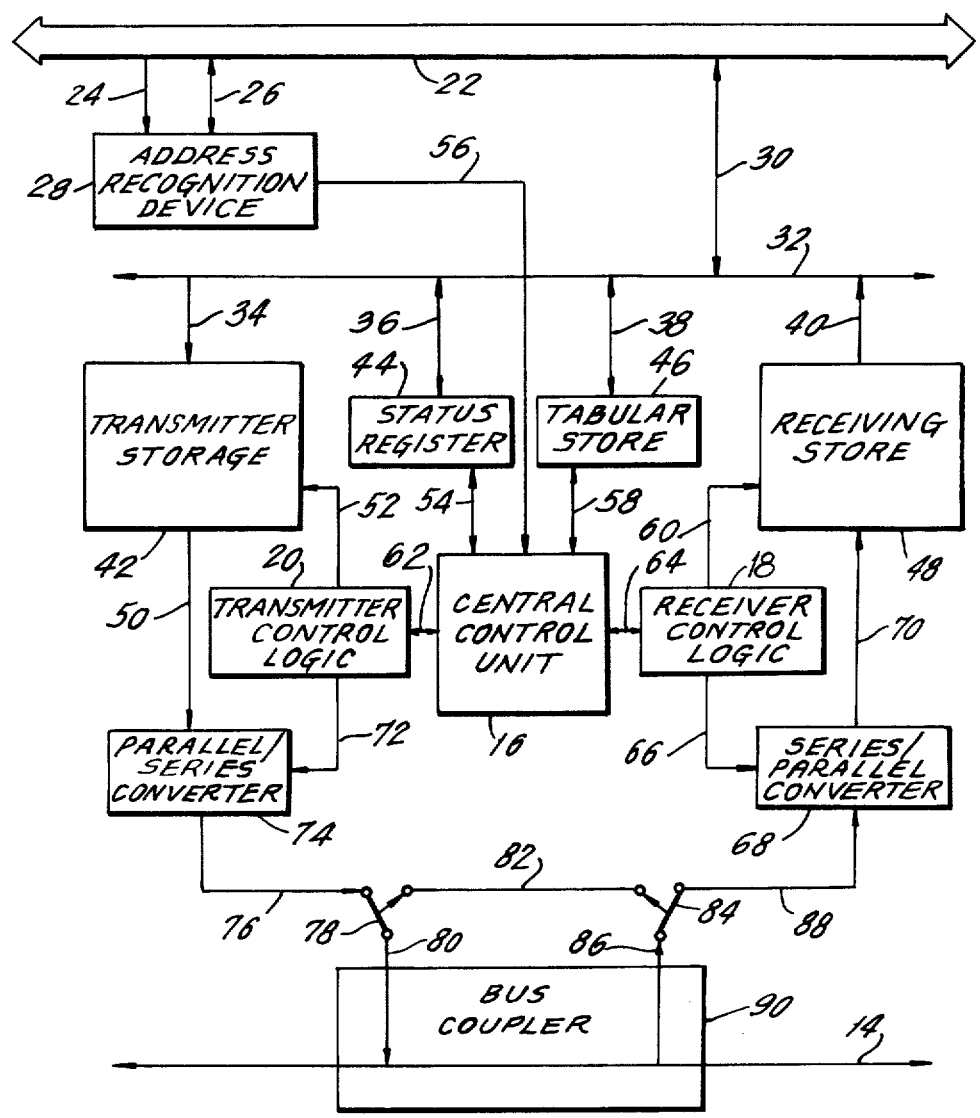

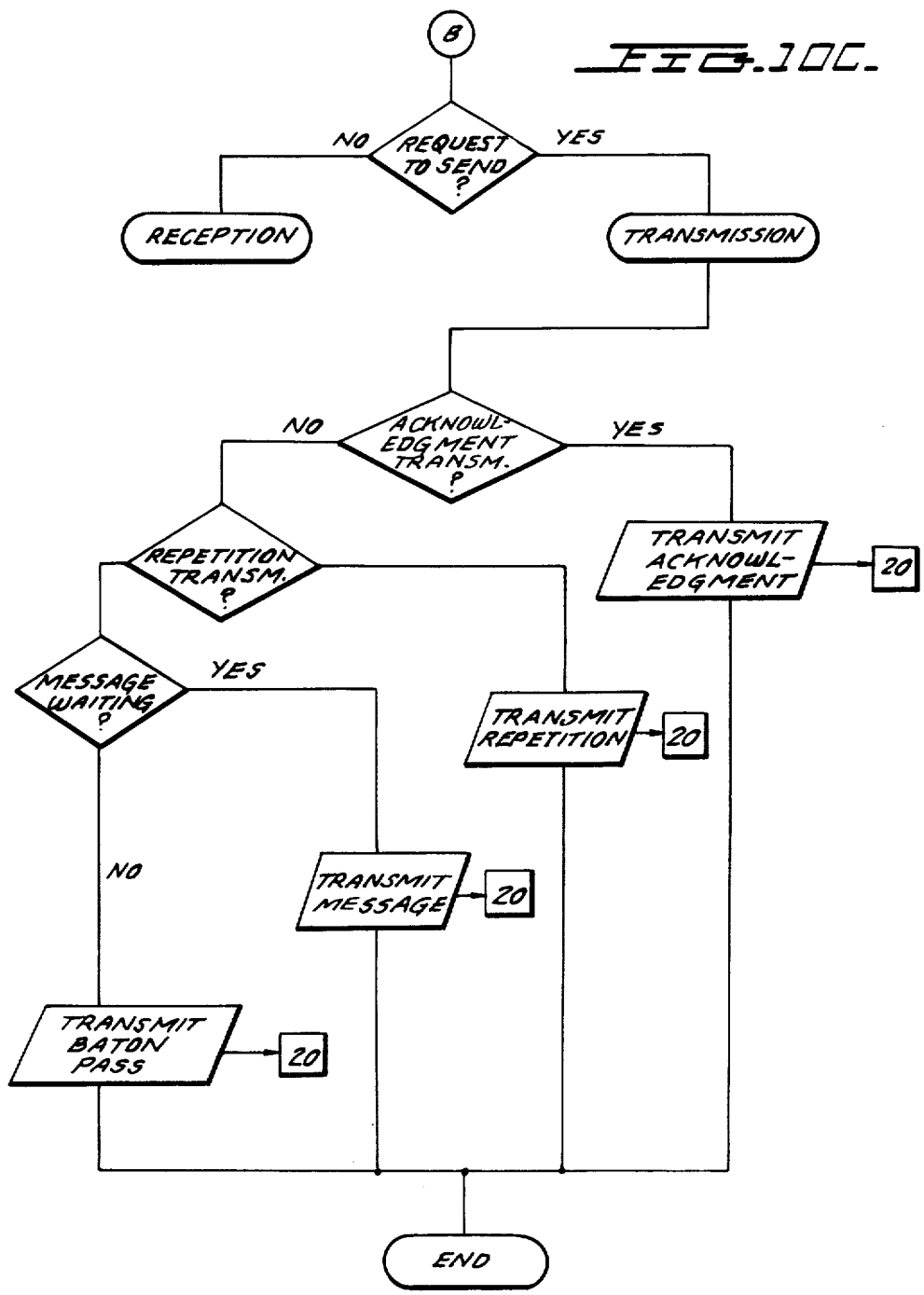

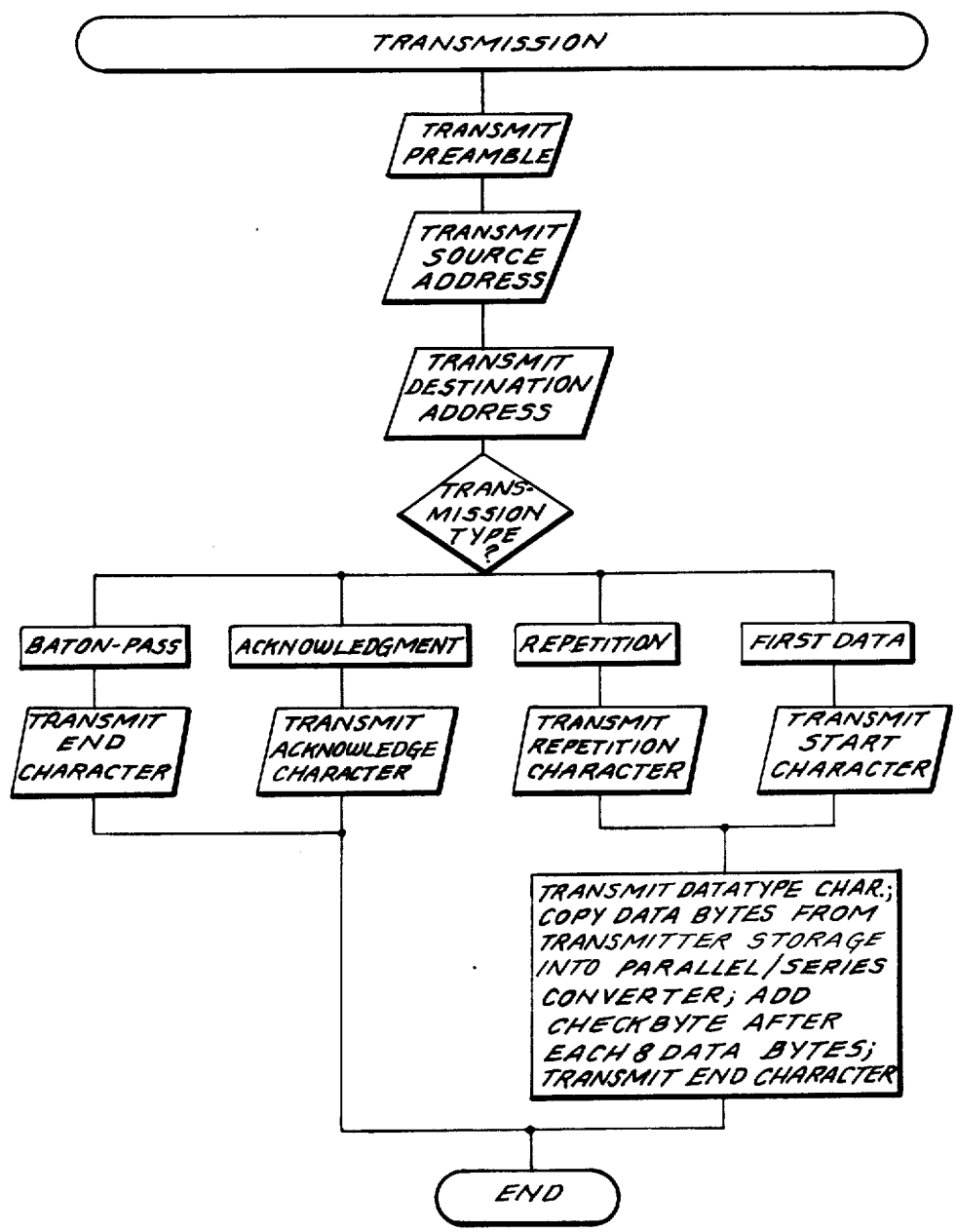

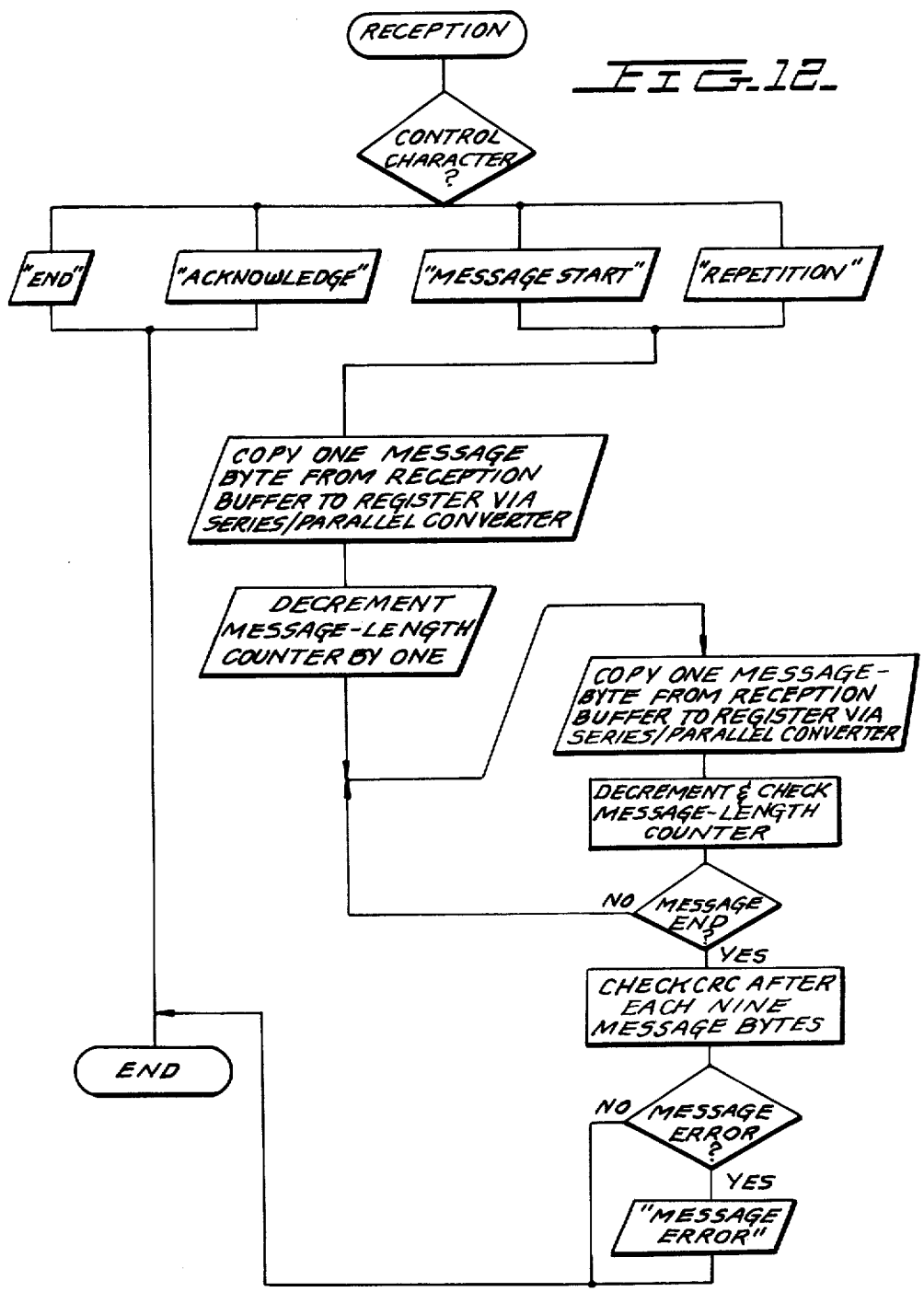

COMMON BUS ACCESS SYSTEM USING PLURAL CONFIGURATION TABLES FOR FAILURE TOLERANT TOKEN PASSING AMONG PROCESSORS

RELATED APPLICATIONS

This application is a continuation-in-part of U.S. Patent Application Ser. No. 194,000, filed Oct. 6, 1980, which is a continuation of U.S. Patent Application Ser. No. 6,907, filed Jan. 26, 1979.

BACKGROUND OF THE INVENTION

The present invention relates to a method for exchanging data between a number of data processors which are connected to each other by one or more common data buses. More particularly, the present invention relates to a method of exchanging data in which the organizational measures required for the sequential flow of the data between the several processors are distributed uniformly among all the processors.

Processor-interconnection methods which exchange data via common data buses are known. In these methods, access to the communication channel (the data buses) is controlled by a central exchange, utilizing either a time-consuming exchange of interrogation and reply messages or additional signal conductors in order to exchange the useful information. The primary disadvantage of such centrally controlled communication systems is that the entire system fails whenever the central exchange fails. This drawback is sometimes overcome by introducing redundant exchanges. However, the switching mechanisms required on failure of the central exchange present problems themselves since the switching mechanism is prone to disturbance and messages may be lost on switching.

Processor-interconnection methods are also known in which the subscribers or processors are connected by ring- or loop-type data buses and in which the necessary organizational functions for sequentially processing data traffic are decentralized. In such methods, the organizational functions are uniformly distributed among all the subscribers. However, the known methods do not satisfy the condition that a message can be transmitted with protection against errors and losses, from any desired subscriber to any chosen number of other subscribers more or less simultaneously. This condition must however be satisfied in data systems in which not only is the acquisition of data to proceed in a decentralized manner, but also evaluation of one and the same message is sometimes required to proceed in a number of processors simultaneously.

BRIEF SUMMARY OF THE INVENTION

A primary object of the present invention is to avoid the foregoing drawbacks of the known systems and to provide a system which satisfies the high demands made in processor-interconnection systems with respect to availability, reliability and efficiency of the system functions with a pre-calculable stepwise degradation of these qualities in response to failure of the components of the system. To this end, the data exchange system of the present invention includes a plurality of data processors and exhibits the following characteristics:

(a) Each message transmitted by any one of the processors includes information identifying both the source of the message and the kind of message being transmitted. This information is transmitted error-protected to each of the remaining processors (i.e., the receiving processors) simultaneously. The receiving processors examine the transmitted message and acknowledge the error-free receipt thereof. The receiving processors further determine, on the basis of selection criteria which are programmed into each processor, which messages are intended for them.

(b) Messages which carry data information which is to be transmitted to at least one of the processors include information blocks of a predetermined constant length or integral multiples thereof.

(c) In the quiescent state, i.e. when information blocks are not being transmitted by any of the processors, access to communication (i.e. the ability to place a message on the data buses) is circulated cyclically from processor to processor. As each processor gains access to communication, it transmits a message which includes both the address of the transmitting processor and the address of the next processor due to obtain access. This message itself passes access to the next processor.

(d) The redundancy contained in the regularity of the chosen organizational functions controlling access to the communication system is utilized as a means of protection against errors in transmission.

In the system according to the invention, the high degree of availability is achieved by decentralization of the intelligence in such a way that those functions which are of decisive importance for the overall function ("vital functions") are laid out redundantly, i.e. a number of processors are in a position to perform these functions.

When data information is to be sent by a given processor, that processor waits until the next time interval during which is gains access to the bus lines. During this interval, the given processor transmits a message which begins with the same addresses as in the quiescent state and adds the data information (in the form of data blocks) to be transmitted. At the start of the data, a data field is reserved for identifying the type of data information being transmitted. The end of each data block contains a check section which is reserved for information to protect the data message against errors in transmission (e.g. a parity bit).

Each of the processors is associated with its own receiving and transmitting device. Hereinafter each associated processor, receiver and transmitter will be referred to collectively as a partner. The data exchange system of the present invention thus comprises a plurality of partners, i.e. processors and their associated receivers and transmitters.

The receiving device of each of the partners includes selection criteria which enable it to decide which kinds of information from which transmitting processors are to be selected for forwarding to its associated processor. The selection criteria of each receiving device are under the program control of its associated processor and can be established either on initialization of the system or during the operation thereof.

In the access-passing-on cycle which follows the transmission of each message, the transmitting partner awaits acknowledgments from all the remaining partners. Each partner which has received an error-free message acknowledges if:

(a) on the basis of its selection criteria its receiver decides not to pass the message to its processor; or (b) on the basis of its selection criteria its receiver decides to pass the message to its processor, and the processor is ready to accept the message.

The acknowledgment is marked by a special end character in the access-passing-on message.

If neither of the stated conditions is satisfied, then no acknowledgment is transmitted. That is, the access-passing-on message is concluded by a normal end character. In addition, the partner establishes an error criterion.

When the acknowledgment cycle contains the acknowledgments of all the partners, the transmission procedure is concluded and the transmitting partner relinquishes access, even if further data information is available for transmission.

The error strategy is conducted by retransmitting the original message (including the data block) with a character identifying it as a repetition if at least one acknowledgment is missing. The retransmitted message is evaluated only by those receiving devices which had registered an error responsive to the preceding message transmission. If the transmitting partner does not succeed in obtaining all the expected acknowledgments after a predetermined number of repetitions, it gives the alarm "transmission error" to its associated processor and passes on the access. In this way the transmitting device gives its associated processor the responsibility for the further treatment of the error, which treatment depends on the particular application of the data exchange system.

In order to monitor the configuration of the data exchange system (i.e. which partners are active and which are not), the channel equipment of each partner contains a "nominal-configuration table" which lists the addresses of all the partners present in the finalized system. In a second table, the "actual-configuration table", a continuous record is made of which partners are active.

If the "actual configuration table" shows gaps in comparison with the "nominal configuration table", the non-active partners are offered the possibility, by periodic interrogation, of becoming active. However, only one (unproductive) call is made to inactive partners per address gap in the ascending sequence of partner addresses (modulo n, n=total number of partners according to "nominal configuration table"). If the called partner does not reply, the transmitting partner immediately calls the next partner in the cyclic address sequence who is active according to the "actual configuration". If a number of partners with neighboring addresses are missing, these are called in successive access cycles.

If a partner drops out, this is first detected by the channel equipment of that partner who wishes to pass on the bus access to the dropped-out partner, since he (the dropped-out partner) does not respond in spite of the repeated call. The calling partner thereupon revises his "actual configuration table", sets up the alarm signal "configuration change" and calls the next partner. In the succeeding access cycle each partner learns of the difference by comparison of the previous "actual-configuration table" with the new "actual-configuration table", and transmits the configuration-change alarm signal to its associated processor. The further handling of this error depends very much on the particular application and falls within the competence of the processors which receive the "configuration-change" alarm signal.

In the extreme case when a processor establishes that it has no partner, the suspicion arises that its own channel equipment is defective. In this case the processor gives the instruction to by-pass the channel equipment and the channel equipment is decoupled from the data lines at both the transmitting and the receiving sides, but this does not interfere with the rest of the data traffic.

With this state of affairs the channel equipment receives the instruction "self check" from the processor. This instruction activates a checking operation of the channel equipment functions. The procedure is terminated with appropriate alarm signals if the existence of erros is established. The handling of the possible errors lies within the domain of responsibility of the processor. If no error is found to exist, initialization may be started up as described below.

With the power supply to the partner switched off, and also immediately after the supply is switched on, the partner is in the "by-passed" state. That is, the partner is decoupled from the data bus-bar at both the transmitting and the receiving device and has no influence on the rest of the data traffic.

The processor gives the instruction for connection of the channel equipment to the common data bus-bar. Thereupon the channel equipment first gives clearance to the receiving path, i.e. the channel equipment monitors whether data traffic is flowing. If this is the case, the channel equipment waits until it receives an address call identifying its associated partner and thereupon becomes active, also activating the transmitting device and transmitting a message to pass on the access to communication to the next partner.

If the channel equipment finds the system to be inactive, a special initialization procedure is followed. Particularly, in order to avoid an initialization conflict which could arise if several partners are switched on simultaneously, each partner waits for a predetermined time interval which dependes on its partner-address, and then starts the bus-access cycle.

It is desirable to ensure that the message head which contains the address of the transmitting and receiving processor and controls the bus access be free of non-detectable transmission errors. Particularly, protection of the message head should be as high as that of the protection of the information block since an undetected mistake in the source address of a message can have the same harmful consequences for the processor control as an undetectable mistake in information data. However, the transmission redundancy in the message head can be substantially reduced and the efficiency of the communication thus enhanced by utilizing the redundancy which is contained in the regularity of the cyclic bus access circulation. To this end, the receiving device of each partner is programmed in such a way that it accepts access (i.e. the processor obtains access to the data bus responsive to the access passing on message) only if:

(1) the message offering access gives no indication of error; and (2) the call originates from the same source as the preceding call that offered access (or alternatively several preceding calls).

The receiving device accepts a message as error-free if:

(1) the information block of the message gives no indication of error;

(2) the offer of access at the head of the message gives no indication of error; and (3) the source address is the same as the destination address in the preceding offer of access.

The availability demands of the data exchange system or the required transmission speed of the system may require that several transmission paths be available. In these cases several transmission devices are associated with each partner and the connecting data bus-bars become multiply employed. In such systems the processors may prescribe preferred paths for the message transmissions. For example, it may be decided that urgent short messages shall be transmitted by one path and less urgent messages or longer strings of messages by another path. The driver programs which pass these messages to the transmission devices respect the indications of the application programs regarding preferred paths as long as the desired transmission paths are functioning. If a transmission path drops out, the drive program automatically routes the messages by those transmission paths which are still functioning.

BRIEF DESCRIPTION OF THE DRAWINGS

For the purpose of illustrating the invention, there is shown in the drawings a form which is preferred at present; it being understood, however, that this invention is not limited to the precise arrangements and instrumentalities shown.

FIG. 1 is a schematic diagram of a bus-access-passing-on message utilized in connection with the method of the present invention.

FIG. 2 is a schematic diagram of a data information message utilized in connection with the method of the present invention.

FIG. 3 is a schematic diagram of an acknowledgment message utilized in connection with the method of the present invention.

FIG. 4 is a timing diagram illustrating, in schematic form, a first exemplary sequence of messages transmitted between a plurality of data processors.

FIG. 5 is a timing diagram illustrating, in schematic form, a second exemplary sequence of messages transmitted between a plurality of data processors.

FIG. 9 is a schematic block diagram illustrating the architecture of one partner of a communications system arranged according to the principles of the present invention.

FIGS 10A-10C together are a flow chart illustrating the central control logic used by the processor of each partner to control communications with the other partners according to the preferred embodiment of the invention.

FIG. 11 is a flow chart illustrating the transmission control logic each partner's transmitteer apparatus uses to transmit a message according to the preferred embodiment of the invention.

FIG. 12 is a flow chart illustrating the reception control logic each partner's receiving apparatus uses to receive incoming messages according to the preferred embodiment of the invention.

DETAILED DESCRIPTION OF THE INVENTION

Figure 8:
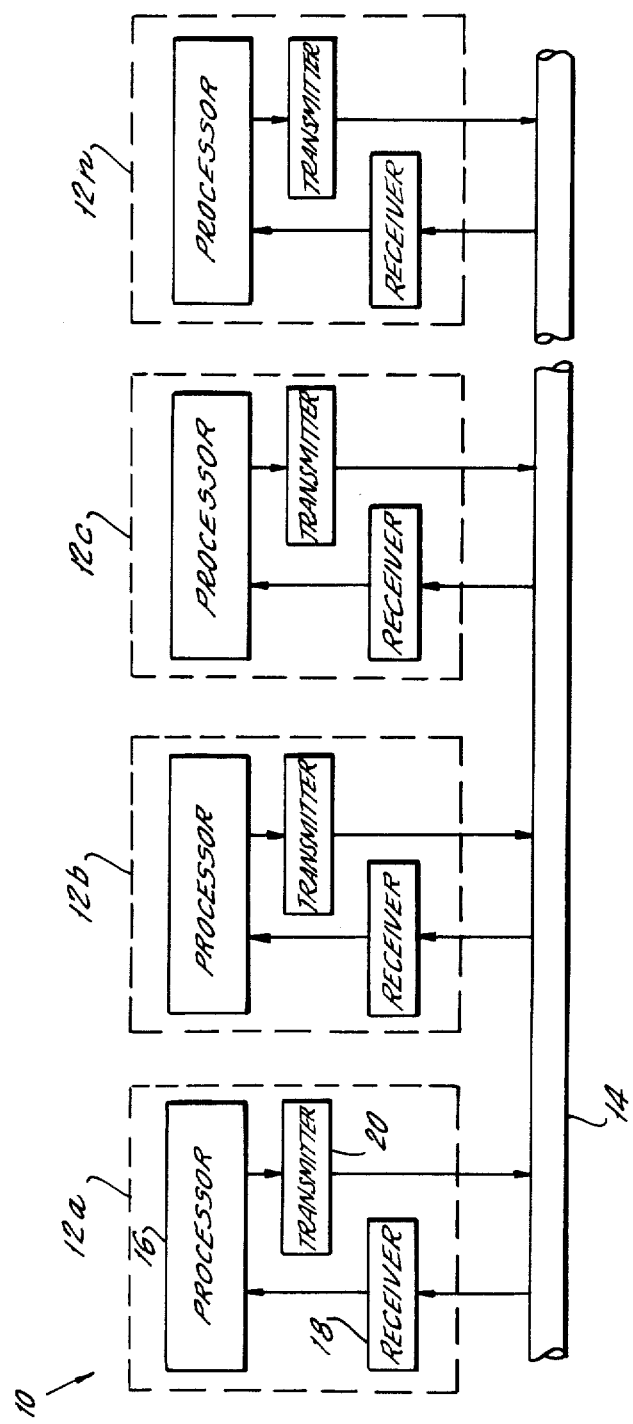
FIG. 8 is a block diagram illustrating a plurality of partners, each including a data processor which communicates with the remaining data processors in accordance with the method of the present invention.

Referring now to the drawings wherein like numerals indicate like elements, there is shown in FIG. 8 a data transmission system constructed in accordance with the principles of the present invention and designated generally as 10. Data transmission system includes n data transmission partners 12a, 12b, 12c, ..., 12n, each of which communicates with the remaining data transmission partners via a common data bus line 14. Each of the data transmission partners 12 includes a data processor 16, a receiver 18 and a transmitter 20.

To understand the manner in which data are transferred between the various partners 12 in accordance with the present invention, reference will be made to FIGS. 1-7. In the following description, it will be assumed by way of example that there are 32 data transmission partners (n=32). Any number of partners may, however, be employed.

Figures 1, 2, 3:
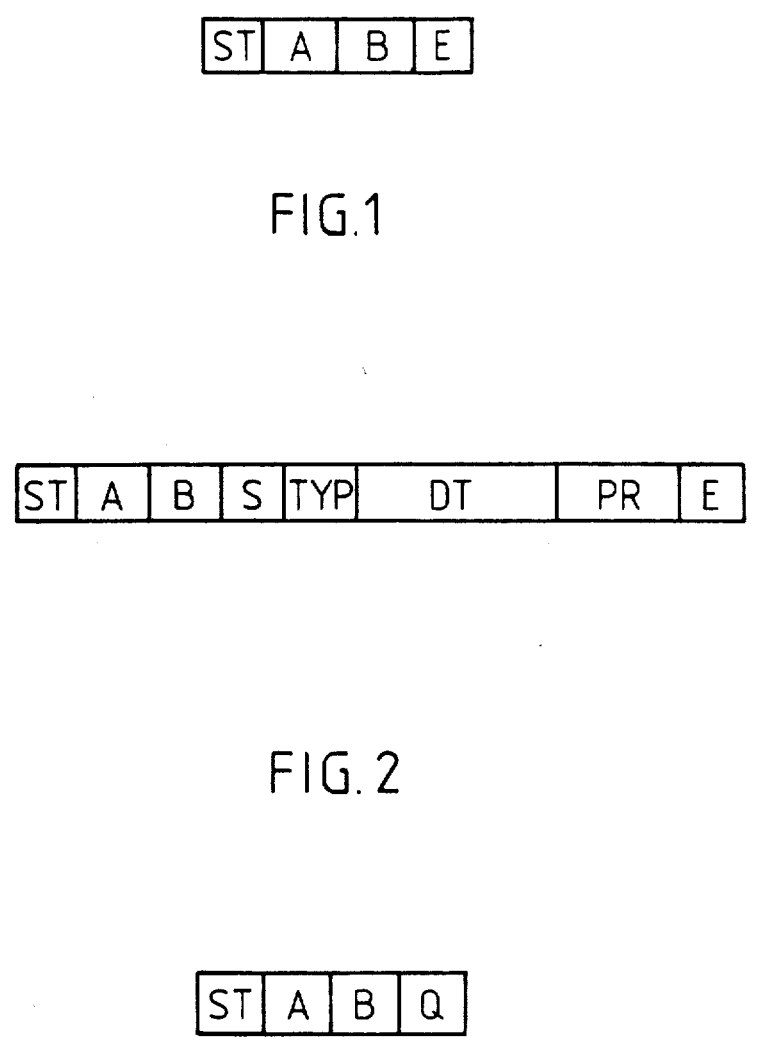

FIG. 1 shows the bus-access-passing-on message including a message head comprising a start-synchronization character ST, a source address A, and a destination address B. The source address A identifies the processor generating the message (e.g. transmitter 20 of partner 12a), and the destination address B identifies the processor which is next to obtain access to the transmission bus line 14 (e.g. the processor 16 of partner 12b). Following the message head is an end character E. The character immediately following the destination address B is called the control character and indicates whether the message is a data message, a repetition of a previously-sent data message, an acknowledgment or a mere baton-pass (access-passing-on) message. ST and E are characters with, for example, 6 bits each; source address A and destination address B are (to suit the system capacity of 32 partners) each expressed by, for example, 5 bits. In each case the addresses are supplemented by an odd parity bit. The bus-access-passing-on message serves to transfer transmission access from one processor to another, as does any message having a header in the proper form, i.e. a start-synchronization character ST, a source address A indicating the partner sending the message, and a destination address B indicating the partner to whom access is being offered.

FIG. 2 shows a data message which begins with the same message heat ST, A, B, as the bus-access-passing-on message. A synchronization character S (the control character) follows the message head and is succeeded by a data field (1 byte) which indicates the kind of information ("TYP") and a 7 byte information block. The succeeding check byte PR monitors the data for errors. The message is terminated by the end character E.

FIG. 3 shows an acknowledgment message, which differs from the bus-access-passing-on telegram (FIG. 1) only by a special control character Q, which is also the end character.

FIG. 4 describes the time sequence of events of a quiescent cycle wherein communication access is transferred between three partners, with the assumption being made that none of the partners has data to transmit. It is further assumed that the three partners having addresses A1, A2 and A3 are actively connected to the communication system and that the remaining partners are disconnected therefrom. Partner P1 (e.g. partner 12a) sends a message in which he first gives his own address A1 as source address and then indicates B2 as the destination address to receive the bus access (i.e. to partner P2). The start-synchronization character ST and the end character E form the frame of the message.

As soon as partner P2 (e.g. partner 12b) has received the message it passes on access to bus line 14 to partner P3 (e.g. partner 12c) in the corresponding manner. If partner P2 had data to transmit, he would use the format shown in FIG. 2, the message header serving to relay bus access to partner P3.

From preceding cycles partner P3 is aware that the partners with addresses 4 to 32, who were present in the finalized structure, have not so far been activated, since he is continuing to keep up his table of the "actual configuration". Nevertheless he always gives all the non-active participants with addresses 4 to 32 the possibility of becoming active by calling one of these addresses at each cycle (this interrogation is indicated by the question mark). If the called partner does not respond, the access to bus line 14 is immediately passed on to partner P1, who is known from the "actual-configuration" table. In this way all the non-active partners 4 to 32 receive in successive access-passing-on cycles the possibility of connecting themselves actively into the communication system.

FIG. 5 shows the sequence of events for three active partners wherein partners P1 and P2 each transmit a data information message. After partner P1 has transmitted the data information message including the information block N1, the partner P1 waits for the acknowledgments from the active partners P2 and P3. Until all acknowledgments have been received by the receiver 20 of partner P1, no data message can be sent by any other partner, and partner P1 cannot transmit any new data message but can only repeat the data message he has just sent (if this is made necessary by any of the other partners failing to acknowledge the data message). At the end of the acknowledgement cycle, if (as shown) partner P1 has received all the expected acknowledgments, it now passes access to partner P2 by means of an ordinary baton-pass message, and partner P2 transmits a new data information message containing information block N2 and then waits for acknowledgments from partners P3 and P1.

Figure 6:
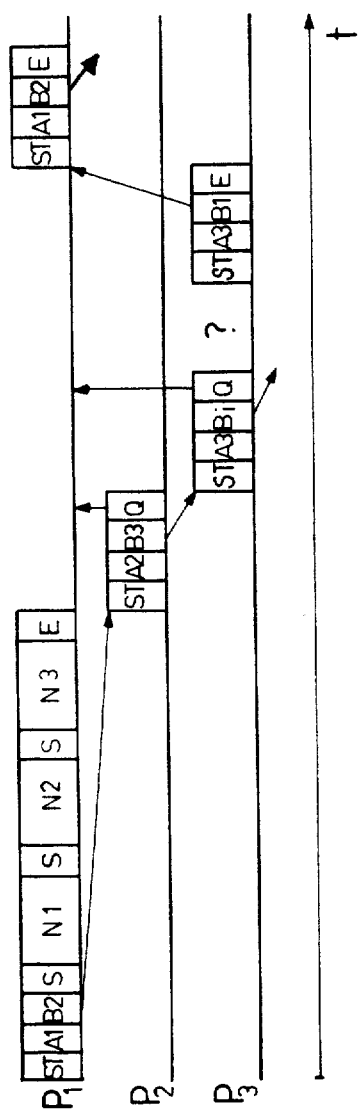
FIG. 6 is a timing diagram illustrating, in schematic form, a third exemplary sequence of messages transmitted between a plurality of data processors.

FIG. 6 shows the case of transmission of a data information message including a string of data information blocks by partner P1. Blocks N1, N2, N3 in the example described each comprise eight useful bytes and one check byte and are separated from one another by the synchronization character S. The last block of messages is terminated by the end character E.

Figure 7:
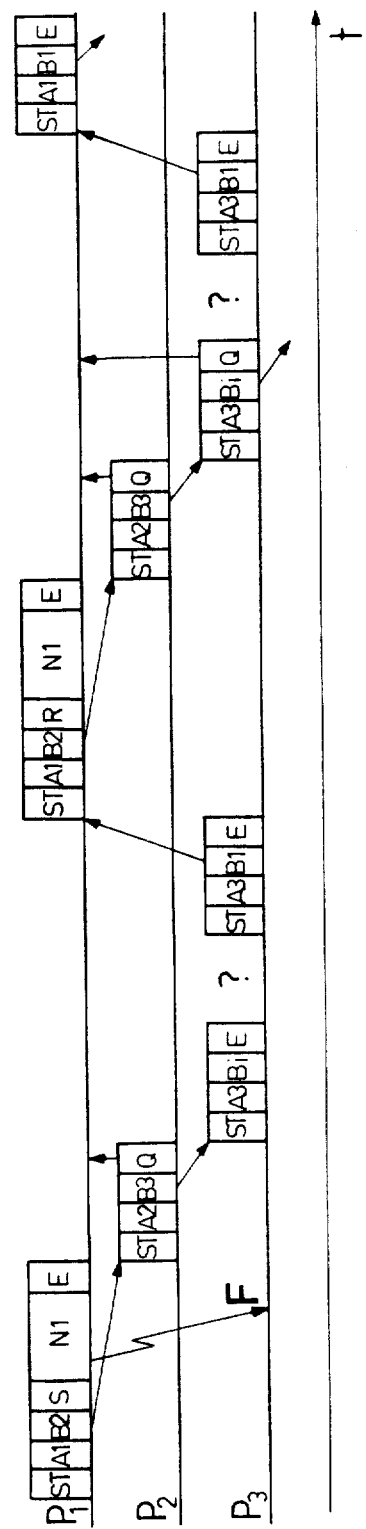
FIG. 7 is a timing diagram illustrating, in schematic form, a fourth exemplary sequence of messages transmitted between a plurality of data processors.

FIG. 7 shows the case of a disturbed transmission of message N1 from partner P1 to partner P3 (error F). In this case the acknowledgment from partner P3 is missing from the acknowledgment cycle succeeding the transmission of the message. Partner P1 repeats the message N1 and indicates by a special character R that this is a repetition of the previous message. Partner P3, who has detected the error in the first transmission, awaits this repetition and, if the repetition contains no error, on this occasion acknowledges in the following acknowledgment cycle. Partner P2, who received the message free from error on the first transmission, does not pass on the repeated message but does acknowledge it on error-free reception.

FIG. 9 shows a block diagram of the channel equipment of one partner of a communications system according to the principles of the invention. The channel equipment is connected to the bus-bar 22 of the processor of the partner, and is also connected to a bus-bar 14 common to all the partners 12a-12n, via a bus coupler 90. Through an address line 24 and a control signal line 26, an address recognition device 28 can receive information from the bus-bar 22 and can transmit information through the signal line 26 to bus-bar 22 and through a line 56 to a central control unit 16 of the partner illustrated. Via data lines 30, 32, 34 and 36, data can be transferred from the bus-bar 22 to a transmitter storage 42, a status register 44 and a tabular store 46, whereby data can be transferred from the status register 44, the tabular store 46 and a receiving store 48 to the bus-bar 22. Data can be transmitted from the transmitter storage 42, via a line 50, a parallel to series converter 74, a line 76, a transmit switch 78, a line 80 and the bus coupler 90 to the common bus-bar 14. Through bus-bar 14 all active processors simultaneously receive the transmitted data.

A transmitter control logic unit 20 is responsible for calling information from the transmitter storage 42, for its parallel-to-series conversion in the parallel-to-series converter 74 and for the addition of error detection information bits to the transmitted message. It is also responsible for the production of the access retransmission telegram (baton pass message) under the control of the central control unit 16.

Messages received from other partners arrive in the receiving store 48, via the common bus-bar 14, bus coupler 90, a line 86, a receiver switch 84, a line 88 and a series-to-parallel converter 68. Receiver control logic unit 18 is responsible for controlling the series-to-parallel conversion and the entry of the information into the receiving store 48. It is also responsible for monitoring the error detection bits of the incoming message, analyzing the transfer criteria (i.e. deciding, on the basis of the identity of the sending partner and the type of message, whether to pass the message on to the receiving partner's processor 16 or not), analyzing the access retransmission message and for following up the list of active partners.

Figure 10A:
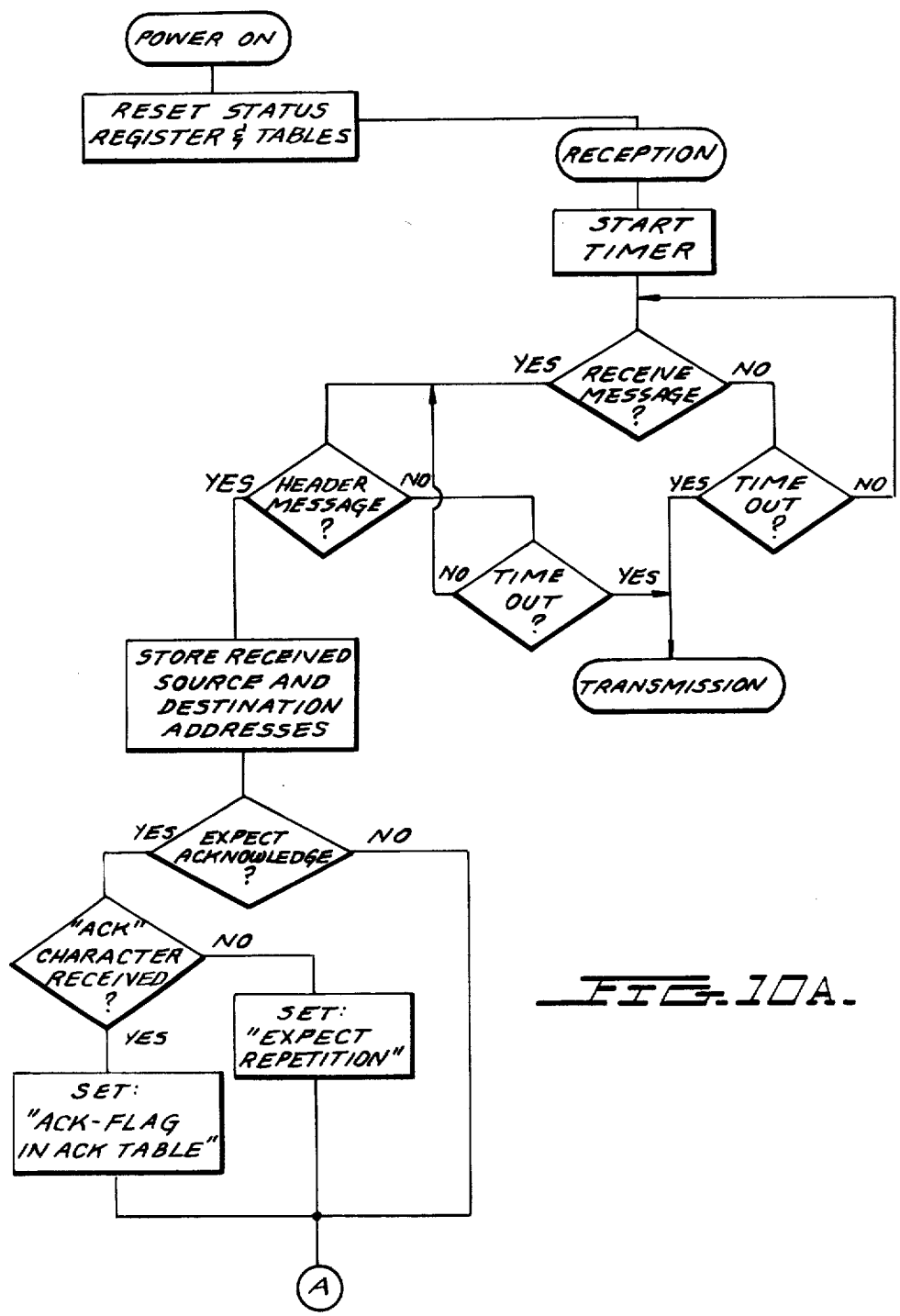
Figure 10B:
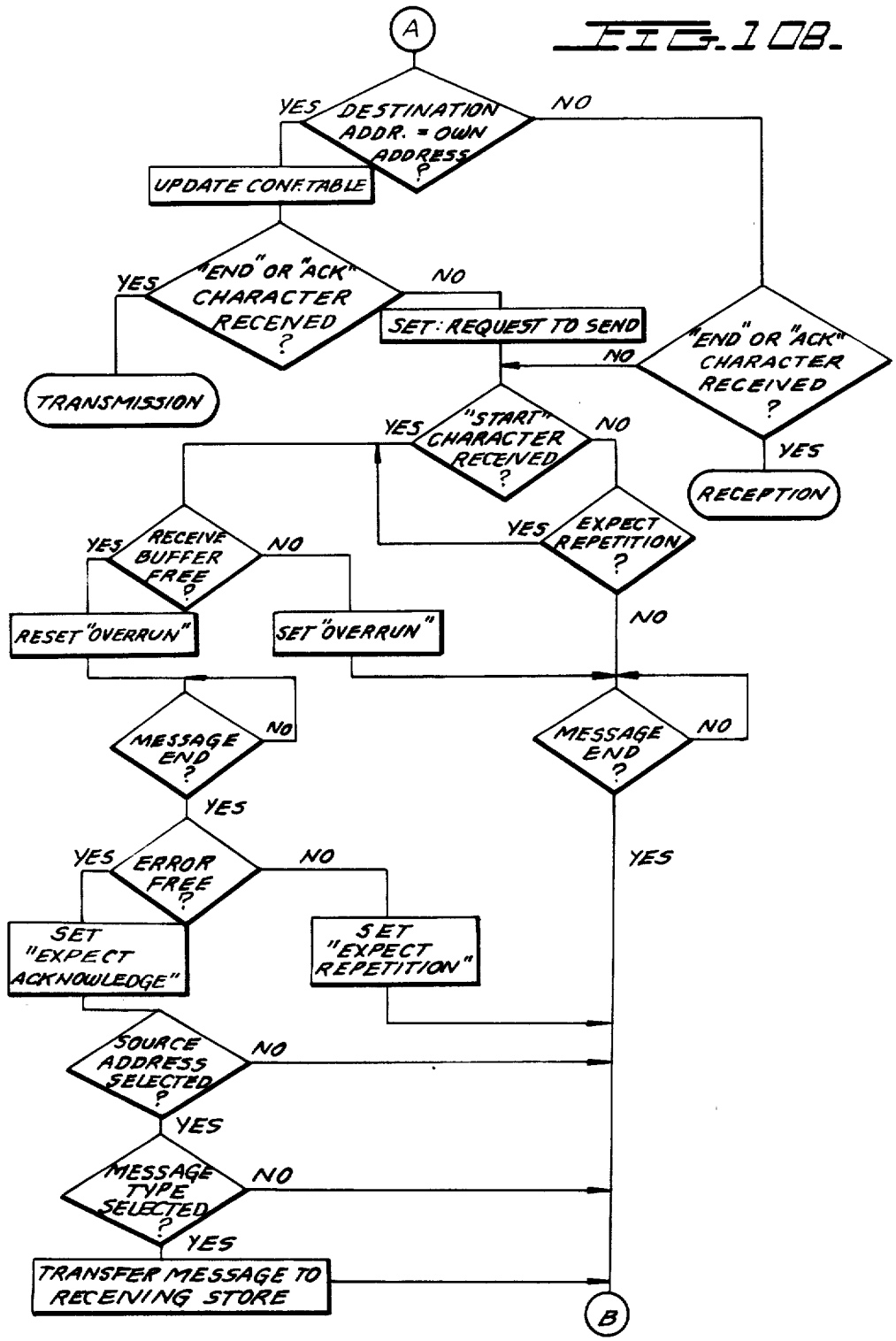

The respective transmitter and receiver control logic units 20 and 18, as well as status register 44 and tabular store 46, supply their information to the central control unit 16, which in turn controls them according to the routine illustrated schematically in FIGS. 10A-10C.

The tabular register 46 has storage locations for nominal and actual configurations of the partners of the system, for acknowledgment of received messages, for transfer criteria, for repetitions due to faulty transmission of data and for the proper addresses.

FIGS. 10A-10C, 11 and 12 are flow charts illustrating the central control unit of each partner, the control logic for transmission, and that for reception, respectively. The preferred embodiment of the present invention will now be described in greater detail with reference to these three flow charts. The transmission and reception routines will be described first, after which the central control will be explained.

As shown by the flow chart of FIG. 11, the transmission routine begins with the transmission of the preamble, which in the illustrated embodiment comprises the start-synchronization character ST. The source address A, that is the address of the partner sending the message, is then transmitted, followed by the destination address B, i.e. the address of the partner to whom the message will pass access. Each of these three transmission steps involves the appropriate character or string of characters ST, A and B, respectively, being supplied from memories in the processor, which preferably contain the characters in parallel output registers. For transmission the characters are supplied to parallel to series converter 74.

After transmission of the preamble, the source address and the destination address, it must be determined what type of message is being sent: a transfer of access (baton pass), an acknowledgment, a repetition of a previously sent but not properly received data message (repetition), or a data message being sent for the first time ("First Data"). In the case of a baton pass message, the end character E is now transmitted, completing the transmission and passing access to the common bus or buses to the partner identified by the destination address B. In the case of a repetition message, the control character R is now transmitted, indicating that a block of data will follow and also indicating that this is a repetition of an earlier data transmission that was not properly received. After the repetition character R, one or more characters indicated as TYP in FIG. 2 are transmitted to indicate the type of data that will follow. After the character R and data-type characters TYP have been sent, the processor copies the data bytes, in blocks of eight bytes, from transmitter storage register 42, which feeds them out in parallel. They are supplied to parallel to series converter 74 for transmission via transmission switch 78, as are all other transmitted characters. At the end of each data block of eight bytes, a check byte, which may for example include a parity bit or other conventional error detection information, is transmitted in the same manner. Finally, the end character E is transmitted.

In the case of the transmission of data that have not already been transmitted once, i.e. an ordinary data message rather than a repetition message, the procedure is the same as in the case of a repetition message except that instead of the repetition control character R, a start character S is sent.

In the reception cycle, illustrated in FIG. 12, a message that has been received by the receiver of the partner is analyzed by the associated processor as follows. If the message header has the proper form, the source and destination addresses of the message are stored by the processor, which processes them in a manner described below with reference to FIGS. 10A–10C. The control character, following the destination address, is identified by the receiver control logic unit 18. If the control character is the end character E or the acknowledgment character Q, the reception process is at an end. If the control character is either a repetition character R or a data message start character S, one data byte which indicates the actual message length is copied from the reception buffer, where the received message is initially stored by the receiver, to receiving store register 48 in the processor via series to parallel converter 68. This data byte is copied additionally into a message length counter. The reception routine then copies a second message byte from the reception buffer to receiving store 48 via series to parallel converter 68, and the message length count is decremented by one. As long as the message length counter contains a number greater than 0, the processor knows that the entire message has not yet been processed. When the count in the message length counter reaches 0, the processor knows that the data block has been completely processed, and that the message is therefore at an end. The processor now checks the error information character or characters PR (see FIG. 2) to determine whether an error has occurred in the transmission of the message. If no error has occurred, the reception routine is at an end. If an error has occurred, the processor registers the fact, which is used in the execution of the central control routine as explained below, and the reception routine is now completed.

FIGS. 10A–10C together form a flow chart illustrating the control routine used by the central control unit 16 of each partner according to one preferred embodiment of the invention. When the power is first turned on, the central control unit 16 automatically resets the status register 22 and the tabular store 46, containing the nominal and actual configuration tables. The central control unit 16 then initiates the reception routine of the receiver control logic unit 18, and thereby receives any message that happens to be transmitted at this time by one of the other partners of the system. As the reception routine is initiated, the central control unit 16 starts a timer, after which it waits until either the timer times out or a message is received, whichever is first. If the timer times out before a message is received, then the partner is free to assume access to the common bus line 14 and initiates the transmission routine carried out by the transmission control logic unit 20, which then transmits a data message if the partner has any data to transmit, and otherwise merely transmits a baton pass message to the next processor listed in the cycle of access transfer.

If a message is received before the timer times out, the central control unit 16 determines whether it is a message having a header in the proper form, that is whether it has the proper initial character ST, a source address A and a destination address B. If the message does not have this format, then it is assumed that an erroneous transmission occurred, and the message is ignored. In this case, the central control unit 16 waits until the timer times out and then assumes access to the common bus line 14 to transmit. It should be noted that each processor has a timer with a different time period, so that if several partners should be turned on simultaneously, they will not all try to assume access to the common bus line 14 for transmission at the same time.

If a message with the correct header has been received, the source and destination addresses listed in the header are stored. If an acknowledgment message is expected, the message is examined to see whether it contains the acknowledgment character Q. This is expected, of course, only if a data message has been received, or has been transmitted by this partner, and the ensuing acknowledgment cycle is not yet complete. If the partner in question has just been turned on, however, naturally no acknowledgment is expected and the central control unit 16 proceeds to point A in the routine (FIGS. 10A and 10B).

If an acknowledgment is expected and if the character Q is received, the central control unit 16 records the fact along with the source address, since this indicates that the partner represented by that source address has correctly received the data message. If a Q character was expected but not received, then the central control unit 16 records the fact that it expects a repetition of the data message to be transmitted. The use to which this information is put is explained below.

If no acknowledgment is expected, then the routine proceeds directly to point A, which is the starting point of FIG. 10B.

It is now determined whether the destination address of the message is the address of this partner. If it is, then the central control unit 16 takes this opportunity to update the tabular store 46. The next block of the flow diagram means that the central control unit 16 determines whether the control character of the message is, on the one hand, an end character E or acknowledgment character Q, or on the other hand a start character S or repetition character R. If it is an E or Q, then the message is complete, and since access has been passed to this partner by virtue of the destination address of the message being that of this partner, the central control unit 16 initiates the transmission sub-routine shown in FIG. 12. At this point the central control unit 16 jumps in its routine from the block labeled "Transmission" in FIG. 10B to that labeled "Transmission" in FIG. 10C, from which point it proceeds in a manner that will be described below.

If the incoming message is addressed to this partner but the control character is neither E nor Q, then the message must be a data message. Since the incoming message passes transmission access to this partner, it will be necessary to send a transmission during the last part of the routine, illustrated in FIG. 10C and explained below. It is now determined whether the control character is the start character S. If so, the message is further processed as will be described shortly. If not, then the control character must by default be the repetition character R, and in this case the partner determines whether a repetition is expected. If it does expect a repetition, then the message is processed, just as if a start character S had been detected. Otherwise, it is assumed that there was an erroneous transmission, and the partner waits until the message is ended and then proceeds to point B of the program (see FIGS. 10B and 10C).

If it is decided to process the message, then the central control unit 16 determines whether the receive buffer is free. If not, then an overrun condition occurs, and the message cannot be accepted. In this case, the partner again merely waits until the message has ended and then proceeds to point B of the program.

If the receive buffer is free, then there is no overrun condition, as is noted by the block labeled "reset 'overrun'", and the central control unit 16 waits until the message has been completely received. It then examines the error indication bits of the message to determine whether there is an indication of error. If an error appears to have occurred in transmission, then the central control unit 16 notes that a repetition transmission should be expected and that it should not acknowledge receipt of the message, and proceeds to point B of the program.

If on the basis of the error bits the message appears to have been received without error, than the central control unit 16 notes than an acknowledgment cycle, in each message of which the final character should be an acknowledgment character Q, will follow. It is then determined whether the message is one which should be passed from the receive buffer on to the processor itself. This is determined by selection criteria that can be programably controlled by the central control unit 16 the criteria being the origin of the message (its source address) and the type of data contained therein. If either of these criteria indicates that the data should not be passed on to the processor, then the central control unit 16 proceeds to point B in the program, allowing the data to be wiped out by the next incoming message without being processed. If the criteria indicate that the data should be accepted, then the message is transferred to the receiving store 48, and again the central control unit 16 proceeds to point B of the program.

The foregoing description of FIG. 10B has been directed to the case in which the destination address is that of this partner. If the destination address is that of another partner, however, then the central control unit 16 determines whether the control character of the message is, on the one hand, either an end character E or acknowledgment character Q, or on the other hand, a data control character (either S or R). If the control character is either E or Q, then the message is complete, no data are to be expected, and transmission access will have been successfully passed on to the next partner in the baton pass cycle, so that a new message should be received shortly. The central control unit 16 therefore reinitiates the reception routine of the receiver control logic unit 18, returning in the central control routine to the block labeled "Reception" in FIG. 10A.

If, on the other hand, the control character is neither E nor Q, then data must follow it, and the central control unit 16 proceeds to examine the data in the same manner as if the message were addressed to this partner. In this manner, any data sent by any partner will be simultaneously received by all the other partners, and will be accepted and processed by those whose selection criteria permit them to do so.

As will be clear from the foregoing description, point B in the central control routine is reached eventually only if a data message has been received. Otherwise, either the central control unit jumps back to the "Reception" block near the beginning of the program to receive the next message or jumps directly to the "Transmission" block following point B (see FIG. 10C), to transmit an acknowledgment or baton pass message, whichever is appropriate.

In the event that a data message has been received, then the processor, if it now has access for transmission by virtue of being the destination indicated by the destination address of the message just received, proceeds to the "Transmission" block below point B in FIG. 10C, initiating the transmission sub-routine carried out by the transmitter control logic unit 20 under direction of the central control unit 16, and illustrated in FIG. 11. If this partner has not received access, however, then it will instead return to the "Reception" block near the beginning of the routine, ready to receive the next message.

In the event that this partner has received access and is therefore ready to transmit, then while the transmission routine illustrated in FIG. 11 is being carried out by the transmitter control logic 20, the central control unit 16 carries out the remainder of its routine, shown in FIG. 10C. Essentially the rest of this routine consists of determining which of the four types of transmission is to be carried out, and then sending appropriate instructions to the transmitter control logic unit 20, as is schematically indicated by the blocks labeled "20" and having arrows pointing to them (FIG. 10C). First it is determined whether the message is an acknowledgment message and if so, instructions for such a message are sent to the transmission control logic unit 20. If the message is not for acknowledgement, then it is next determined whether it is a repetition transmission. If so, the transmission control logic unit 20 is instructed to retransmit the data contained in transmitter storage 42, using the control character R. If the transmission is not a repetition transmission, however, then it is determined whether there are new data in the transmitter storage 42 waiting to be transmitted. If there are, the central control unit 16 instructs the transmitter control logic unit 20 to transmit these data, preceded by the control character S. If the message is merely a baton pass message, however, then no data are sent, but merely the header followed by the control character E. After one of these four types of transmission is complete, the central control unit 16 has become to the end of its routine, and it returns to the "Reception" block near the beginning of the program to receive the next incoming message, which will be transmitted by the next partner in the baton pass cycle.

It should be noted that the timer is reset each time the reception routine is initiated. If no message is received within a set time after this partner has transferred access to the next partner in this partner's active configuration table, it is clear that the next partner is inactive after all, and this partner will resume access and transmit a new baton-pass message addressed to the next succeeding partner in the active-configuration table, while updating the table.

The operation of the central control unit 16 in accordance with the routine explained above will now be described with reference to the routine in order to clarify it further.

The first situation to be considered will be a baton pass message. The message is received by the receiving control logic unit 18, and is identified by the central control unit 16 as a message having a proper header. The source and destination addresses are stored. Since no acknowledgment is expected, the program proceeds to point A. If the destination address of the message is this processor's address, then the configuration table is updated if necessary, and then the central control unit 16 proceeds to the transmission portion of the program, beginning with the "Transmission" block in FIG. 10C, since the baton pass message ends with the character E. Assuming that the partner in question has no data to transmit, the transmitter control logic unit 20 is instructed to transmit a baton pass message transferring access to the next partner in the cycle, and the routine comes to an end.

If the partner in question does have data to transmit, then this is done instead of sending only a baton pass message.

If on the other hand the destination address of the received baton pass message is that of another partner, then since the control character E has been received, the central control unit 16 returns to the "Reception" block near the beginning of the program to await the next incoming message.

For the next situation, let it be assumed that a data message is received, and that the destination address is that of this partner. Since no data message can be sent by any of the partners before the completion of the acknowledgment cycle of an earlier data message, it will be clear that the central control unit 16 will not be expecting an acknowledgment, and it accordingly proceeds directly to point A of the routine. Since the data message is addressed to this partner, and since it is a data message having the control character S, the message will be received if the receive buffer is free. Assuming that this is the case once the message has been received, it will be examined for apparent error. If no error is detected, and if the selection criteria are met, the incoming data are transferred to the receiving store 48. In this case, and also in the case where the message is received error-free but does not meet the selection criteria for being passed to this partner's processor, the central control unit 16 proceeds to point B of the program. Since the incoming message was addressed to this partner, which accordingly now has access, a transmission is now sent, acknowledging the error-free receipt of the message, whether or not it fulfilled the selection criteria. The routine is now ended, and since the acknowledgment message also serves to pass access on, this partner will now return to the beginning of the program to await the next message.

If the message was not received error-free, or if the receive buffer was not free, so that the message could not be received, than no acknowledgment will be sent. In this case, the message that is transmitted will simply be a baton pass message ending with the control character E rather than the acknowledgment character Q (see FIG. 7). This will inform the partner that sent the data that they were not properly received by this partner, to whom a repetition must therefore be sent after the completion of the acknowledgment cycle, and this processor will be expecting such a repetition.

In the event that the incoming data message has a destination address for a different partner, the message will be processed in the same way as described above, except that since access has not been passed to this partner, when it reaches point B of the routine it will proceed to the "Reception" block rather than the "Transmission" block and will return to the beginning of the routine to await the next message.

In the event that one processor has transmitted a data message, and that the ensuing acknowledgment cycle is in process, and that this partner is not the first one in the baton pass cycle after the partner which sent the data message, then at some point in the acknowledgment cycle, this partner will receive a message from its predecessor in the pass-along cycle. If the predecessor correctly received the data message, the incoming message now received by this processor will be an acknowledgment message. The central control unit 16, expecting an acknowledgment message in view of the preceding data message, will note that the acknowledgment message has been received, and will proceed through point A of the routine to the transmission step, where it will transmit its own acknowledgment message, if it has properly received the data, or an ordinary baton pass message if it has not.

If the incoming message is an ordinary baton pass message rather than acknowledgment, the central control unit 16, knowing that an acknowledgment was to be expected, will now take note that a repetition of the data transmission must be expected at the completion of the acknowledgment cycle.

When this processor transmits a data message, it expects that the next transmission from each of the other active partners will be an acknowledgment message. It accordingly looks for the acknowledgment character Q at the end of the next message from each of the other active partners. If any of these characters is missing, then it repeats the data transmission as many times as necessary for each of the active partners to receive it properly at least once or until a predetermined number of attempts have been made, in which case the originator of the data gives up and transfers access to the next partner in the baton pass cycle.

If this partner determines that no other partner appears to be active, then lines 76 and 88 are connected by means of switches 78 and 84 and a bypass line 82. The processor then reswitches switch 84 and then the send switch 78, after determining that there is no malfunction in its own channel equipment, and attempts to begin communication with other partners in the same manner as when power is first turned on, as described above.

One advantage of the invention resides in the fact that no main or central processor is required. Every message sent is forwarded by the common bus 14 to all partners of the system. Provision of the header, including the source and destination addresses, serves to indicate which partner is next to receive access to transmission.

The present invention may be embodied in other specific forms without departing from the spirt or essential attributes thereof and, accordingly, reference should be made to the appended claims, rather than to the foregoing specification as indicating the scope of the invention.

What is claimed is:

1. A data exchange system, comprising:
   (A) a plurality of data processing partners;
   (B) data bus means for interconnecting said data processing partners, said data processing partners communicating with each other via said data bus means; and
   (C) individual channel equipment means associated with respective ones of each of said data processing partners for interfacing said respective partners to said data bus means and for:
      (1) sequentially transferring access to said data bus means to another partner of said plurality of data processing partners by generating an access-passing-on message and transmitting said access-passing-on message on said data bus means, said access-passing-on message including a source address block identifying the address of said respective partner and a destination address identifying the address of a next partner which is to receive access to said data bus means;
      (2) maintaining a nominal configuration table which includes the addresses of all of said partners and an actual configuration table which includes the addresses of all partners which are active participants in said data exchange system, said partners which are active participants periodically offering access to said data bus means to partners whose addresses are not included in said actual configuration table;
      (3) generating a data information message and transmitting said data information message after said respective partner has gained access to said data bus means whenever said data information message is to be transmitted, said data information message including an address block identifying the address of said respective partner, a destination address identifying the address of said next partner, and informaion type block identifying the type of information being transmitted and at least one data information block containing the data being transmitted, each of said data information blocks being the same length;
      (4) determining whether its respective partner is to process a received data information message; and
      (5) generating an acknowledgement message and transmitting said acknowledgment message sequentially on said data bus line whenever a received data information message was free from errors; said channel equipment means operating independently of any processor external to its respective partner.

2. The system of claim 1, wherein said acknowledgment message includes a source address block identifying that said partner whose channel equipment means generated said acknowledgment message and a destination address block identifying that partner whose channel equipment means is next to generate said acknowledgment message.

3. The system of claim 2, wherein said data information message further includes a data block used by said channel equipment means to determine if said data information message is received with or without errors.

4. The system of claim 1, wherein each of said channel equipment means comprises a data processor and associated receiving and transmitting devices and wherein each of said receiving devices decides which types of data information messages from which of said partners are to be forwarded to its associated data processor as a function of a set of selection criteria associated with said receiving device.

5. The system of claim 4, wherein said selection criteria associated with each of said receiving devices are controlled by its associated said processor and wherein said selection criteria can be established both upon an initialization and during operation.

6. The system of claim 4, wherein each said receiving device which has received a data information message free from errors acknowledges said receipt by generating said acknowledgment message if at least one of the following two conditions is met:
   (A) on the basis of its associated selection criteria it decided not to forward the received data information message to its associated data processor; or
   (B) on the basis of its associated selection criteria it decided to forward said data information message to its associated data processor and its associated data processor was ready to accept it.

7. The system of claim 6, wherein said acknowledgement message comprises a message organized as said access-passing-on message, but not including a special end character.

8. The system of claim 7, wherein each said receiving device which receives the last generated said data information message but does not meet either of said two conditions generates said access-passing-on message and establishes an error criterion.

9. The system of claim 6, 7 or 8, wherein a said partner having access to communication relinquishes said access whenever it has received an acknowledgment message from each of the remaining said data processing partners even if a further data information message is available for transmission.

10. The system of claim 6, 7 or 8 wherein a partner which has access to communication having already transmitted said data information message, retransmits said message with a special character identifying it as a repeated data information message whenever said partner having access to communication does not receive an acknowledgment message from each of the remaining partners.

11. The system of claim 10, wherein only those data processing partners which did not generate an acknowledgment message responsive to a last data information message evaluate said repeated data information message and generate an acknowledgment message to indicate the error free receipt thereof.

12. The system of claim 11, wherein said partner having access to communication generates a transmission error alarm and passes access to said data bus means to next partner to receive access to communication whenever it does not receive an acknowledgment message from each of said remaining partners after a predetermined number of retransmissions of said data information message.

13. The system of claim 1, wherein each of said channel equipment means includes a central control unit which communicates with said data bus means via associated transmitting and receiving devices and wherein said central control unit is capable of selectively connecting and disconnecting said partner from said data bus means via said associated transmitting and receiving devices, those said data bus means, a connected central control unit being labeled active and a disconnected central control unit being labeled inactive.

14. The system of claim 13, wherein each time a partner having access to communication determines that the central control unit of at least two partners with addresses which immediately follow in their access order to said data bus are inactive, said partner having access to communication calls only one of said at least two inactive partners each time it regains access to communication.

15. The system of claim 14, wherein said central control unit:
updates its said actual configuration table to indicate that a partner whose address appears next on said actual configuration table is inactive whenever said partners whose address appears next does not acknowledge with said acknowledgment message after a predetermined number of retransmissions of said particular access-passing-on message; and wherein said central control unit
thereafter transmits the access-passing-on message with a destination block identifying the address of the active partners whose address is next on the so updated actual configuration table.

16. The system of claim 15, wherein each said central control unit disconnects itself from said data bus means and checks its own operation whenever its updated actual configuration table indicates that all other partners are inactive.

17. The system of claim 16, wherein each said central control unit reconnects itself to said data bus means after being disconnected by determining that it is operating properly, said determination being carried out by reconnecting itself through its associated receiving device and determining that messages are being transmitted on said data bus means, and based thereon, reconnecting itself through its associated transmitter device in response to a message on said data bus means which designate said central control unit as a next unit to gain access to said data bus means.

18. The system of claim 17, wherein said central control unit also reconnected itself to said data bus means upon determining that no messages are being transmitted on said data bus means, said central control unit reconnecting itself through its associated transmitting device after a predetermined time which is selected to be proportionally related to its address.

19. A data exchange method for a system having a plurality of data processing partners, a data bus for interconnecting said data processing partners, said data processing partners communicating with each other via said data bus, individual channel equipment circuits associated with each respective one of said data processing partners, said channel equipment circuits operating in conjunction with said respective data processing partner to guarantee that only one of said partners is allowed to transmit over said data bus at any given time, said system further being of the type which does not employ a central controller and which is designed to continue its data exchange even after the failures of several of said plurality of data processing partners, said method comprising the steps of:

(A) sequentially transferring access from a partner who has access to said data bus to a next partner by generating an access-passing-on message and transmitting said access-passing-on message over said data bus, said access-passing-on message including a source address block identifying the address of said partner who has access to said bus and a destination address identifying the address of said next partner, said next partner being selected from an actual configuration table maintained by each of said partners;

(B) generating data information messages and transmitting each of said data information messages over said data bus whenever said partner who has access to said data bus has data information available for transmission, said data information message including an address block identifying the address of said partner who has access to said data bus, a destination address identifying the address of said next partner, and information type block identifying the type of information being transmitted and at least one data information block containing the data being transmitted, each of said data information blocks being the same length;

(C) determining at each one of said partners whether said partner is to process a received data information message;

(D) generating at each partner which has received a data information message which was free of errors, an acknowledgment message and sequentially transmitting said acknowledge message on said data bus, each said partner generating said acknowledgement message in a predetermined sequence with respect to the remaining partners;

(E) maintaining at each partner a nominal configuration table which includes the addresses of all of said partners and said actual configuration table which includes the addresses of all partners which are active participants in said data exchange system, said partners which are active participants periodically offering access to said data bus means to partners whose addresses are not included in said actual configuration table; and (F) allowing said partner who has access to said data bus to transfer access to another partner which is listed in said actual configuration table immediately after said next partner in the event that said next partner fails to acknowledge said acknowledgment message.

20. A system according to claim 13 wherein said channel equipment means further comprise a bus-bar and an address recognition device, said address recognition device being coupled to said bus-bar and allowing said central control unit to cooperate with its respective one of said plurality of data processing partners, said bus-bar being further coupled to a respective one of said transmitting and receiving devices so that information may be transferred between said data bus means and said data processing partners.

21. The system of claim 20, further comprising a transmitter control logic and a receiver control logic, said central control unit operating in conjunction with said transmitter control logic and said receiver control logic to control said transmitter storage and said receiving store, respectively.

22. The system of claim 21 further comprising a parallel/series converter and a bus coupler, said parallel/series converter being interposed between said transmitter storage and said bus coupler and being under control of said transmitter control logic and operating to transfer the data from said transmitter storage to said bus coupler for transmission over said data bus means, and wherein said system further comprises a series/parallel converter interposed between said receiving store and said bus coupler, said series/parallel converter being controlled by said receiver control logic and operating to transfer data from said data bus means through said bus coupler to said receiving store.

23. The system of claim 15, further comprising a tabular store register, said tabular register comprising a memory in which said nominal configuration table and said actual configuration table are maintained, said tabular register also serving for keeping track of acknowledgment of received messages and of transfer criteria so that said central control units may determine whether repetitions of messages due to faulty transmissions are required.

* * * * *